United States Patent [19]

Lin

[11] Patent Number: 5,673,242
[45] Date of Patent: Sep. 30, 1997

[54] METHOD FOR CONTROLLING THE SPINDLE MOTOR SPEED OF AN AUDIO/VIDEO DISK PLAYER

[76] Inventor: Chi-Cheng Lin, No. 6, Feng Shu Tsuen, Kweishan, Taoyuan, Taiwan

[21] Appl. No.: 549,041

[22] Filed: Oct. 27, 1995

[51] Int. Cl.$^6$ .......................................... G11B 5/09
[52] U.S. Cl. ................................ 369/50; 360/73.03
[58] Field of Search ...................... 369/50, 47, 48, 369/54, 58, 53; 360/73.03, 73.01, 75, 69, 73.08

[56] References Cited

U.S. PATENT DOCUMENTS 5,402,200   3/1995   Shrinkle et al. ................. 360/69
5,453,972   9/1995   Kanazawa et al. ............... 369/219
5,502,700   3/1996   Shinada ............................ 369/50
5,544,138   8/1996   Bajorek et al. .................... 360/69

*Primary Examiner*—Thang V. Tran
*Attorney, Agent, or Firm*—Fish & Richardson P.C.

[57] ABSTRACT

A method for controlling speed of a spindle motor within a disk player is provided. The spindle motor drives a disk thereon and the disk player includes a control circuit. The method comprises the steps of: (1) set speed of the spindle motor to operate at a Nominal speed; (2) test if disk data access operation has not occurred for a predetermined amount of time; (3) if result of step 2 is YES, set the spindle motor running at a speed which is between zero and the Nominal speed.

2 Claims, 3 Drawing Sheets

METHOD FOR CONTROLLING THE SPINDLE MOTOR SPEED OF AN AUDIO/VIDEO DISK PLAYER

TECHNICAL FIELD OF INVENTION

The invention relates to an optical information reproduction apparatus and, in particular, power saving method of the optical information reproduction apparatus.

BACKGROUND OF INVENTION

Optical disk player such as digital audio-video disc player or information disc apparatus is basic component of the state-of-art multi-medium computer system.

The prior art control systems for the information disk apparatus known to the inventors of this invention includes the U.S. Pat. Nos. 4,485,337, 4,783,774, 5,289,097, 5,246,1019 and 5,345,3101.

The U.S. Pat. No. 4,485,337 discloses a servo data driven motor speed control. The disclosure uses the servo data present on all disk drives to provide an indication of rotational velocity. The circuit ordinary associated with the disk drive's servo system is utilized by the disclosure to recover the sync pulses present in each frame of servo data. The invention then couples the recovered sync pulses into the speed control circuit. The speed control circuit compares the frequency of the recovered sync pulses with the frequency of a reference oscillator. The result of the comparison is used to adjust the selection of a predetermined number of duty cycles of power application to the disk motor. The period of the duty cycle is determined by the frequency of the sync pulses.

The U.S. Pat. No. 4,783,774 discloses a control system for driving an optical information reproducing apparatus at a relatively low power consumption and a high power conversion efficiency. The disclosure employs a circuit for producing a response control signal and a drive circuit for applying the turntable motor or the pickup transfer motor with a power supply voltage which is changeable in response to the response control signal.

The U.S. Pat. No. 5,289,097 discloses a spindle control method and apparatus for disk drive. Responsive to detecting a start-up or an idle operation mode, a pulse width modulation mode control is applied to drive current to the spindle motor. Responsive to detecting one of the predetermined critical operations, a linear mode control is applied to drive current to the spindle motor. A small percentage of the overall file power-on time is spent performing critical file operations so that substantial power saving are achieved by the PWM mode control. The error rate reduction that results by operating in the linear mode during critical file operation is also advantageous.

The U.S. Pat. No. 5,246,1019 discloses a drive motor controller for low power disk drive. The disclosure uses a switching regulator type DC/DC power converter to control spindle motor speed. In the switching regulator, a switching transistor is located near the ground side of the circuit so that a low resistance n-channel power MOSFET switching transistor is employed.

The U.S. Pat. No. 5,345,3101 discloses a disk drive with several reduced power modes. The disclosure employs a control system which allows the disk drive to automatically enter and operate in reduced power modes when the drive is not actively reading or writing data in response to commands from the host computer. The power savings in these modes are achieved by selectively disabling certain electrical components of the disk drive. These electrical components include spindle controller, actuator controller and servo controller circuitry, which control operation of spindle motor, actuator motor, and read/write head positioning respectively. The controller circuits are in turn under the control of a drive microcontroller which is programmed to control entry and exit from the reduced power modes.

SUMMARY OF THE INVENTION

While the prior art control systems provide generally effective operation to meet the respective object of the invention, it is desirable to provide a method for controlling the spindle motor speed of the audio-video disk player such that a reduced power consumption thereof is achieved.

The first step is to set speed of the spindle motor to operate at a Nominal speed. The second step is to test if disk data access operation has not occurred for a predetermined amount of time. The third step is to set the spindle motor running at a speed which is between zero and the Nominal speed, if result of step 2 is YES.

BRIEF DESCRIPTION OF APPENDED DRAWINGS

DETAILED DESCRIPTION OF THE PREFERRED EMBODIMENT

Figure 1:
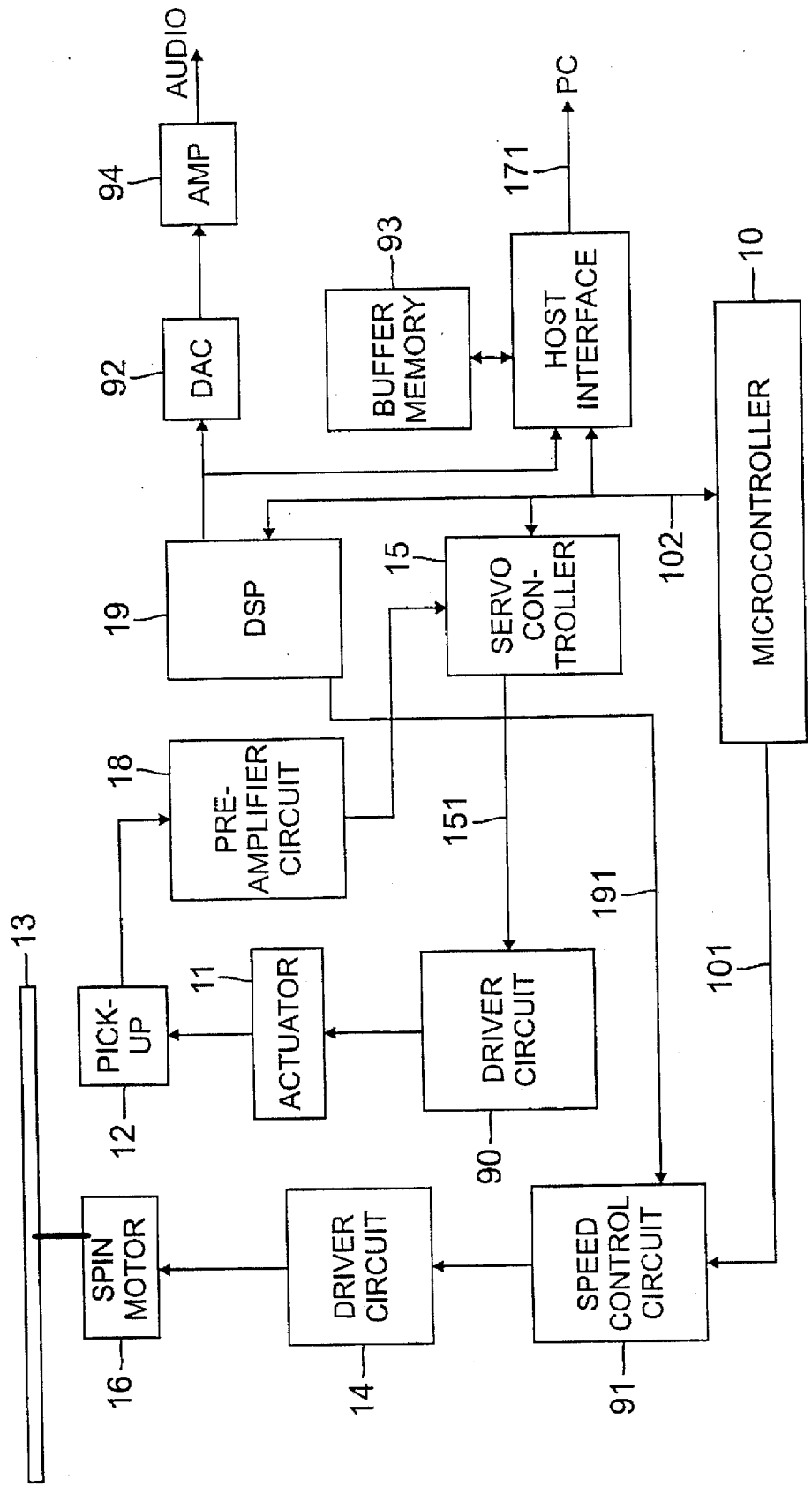
FIG. 1 shows mechanical and electrical components of a disk system in which the present invention may be employed.

Referring to FIG. 1, the mechanical and electrical components of a typical disk drive system includes a head/disk assembly (HDA) having therein an actuator 11, which preferably includes a radial coil, a focus coil and an actuator motor, which positions the pickup head 12 to different radial positions relative to the surface of disk 13. HDA also includes read preamplifier circuitry 18 for amplifying the data and servo information from the disk surface. The device 18 also contains a read buffer for supplying read data from the particular track selected for reading. The digital signal processor (DSP) 19 receives analog read data from circuitry 18 in the IDA. As well known in the arts, DSP 19 includes a read channel analog filter which supplies the analog signal to a pulse detector (not shown). The output of pulse detector is supplied to a data separator (not shown) as raw digital read data. The disk drive circuitry components, i.e. 19, 15, interface with a microcontroller 10 through a bus 102 which carries address, control and data information, as is well known in the art. The disk drive control circuit further includes a servo controller section 15 for detecting and processing servo information from disk 13 relating to servo bursts, sync pulses and track ID number indicating the radial position of pickup head 12 relative to the disk surface. Servo controller section 15 connects to microcontroller 10 through bus 102 and operates to control the flow of information relating to servo read timing and control. Servo controller section 15 preferably includes servo controller, analog-to-digital to-digital (A/D) converter circuitry and digital-to-analog (D/A) circuitry. The analog output 151 from servo controller section 15 is supplied as an input to the actuator driver circuitry 90. Circuitry 90 includes power amplifier control circuitry which supplies an actuator drive signal to a power amplifier which in turn supplies control current to actuator 11 in HDA. The system shown also includes spindle motor control driver circuitry 14 for controlling the spindle drive motor 16 in HDA for rotating audio-video disk 13. The disk drive also includes a host interface 17 which operates to provide control and information paths between a host computer, through a bus 171 and the bus 102, and the associated elements shown. A buffer memory 93 is provided to accommodate differences in data transfer rate between the host interface 17 and host computer and that between the host interface 17 and drive. In other words, the buffer memory temporarily stores the video-audio information read from the disk 13. The DSP 19 also provides a feedback signal 191 into a digital motor speed control circuit 91 which compares the feedback signal 191 with a signal 101 from microcontroller 10. The result of comparison provides an indication of whether the motor is spinning too fast or too slow at the present time with regard to data transfer rate. The result of the comparison are used to control the motor driver 14, which provides power to the spindle motor 16. The device 92 is Digital/Analog converter and the output of the device 94 is audio signal.

Figure 2:
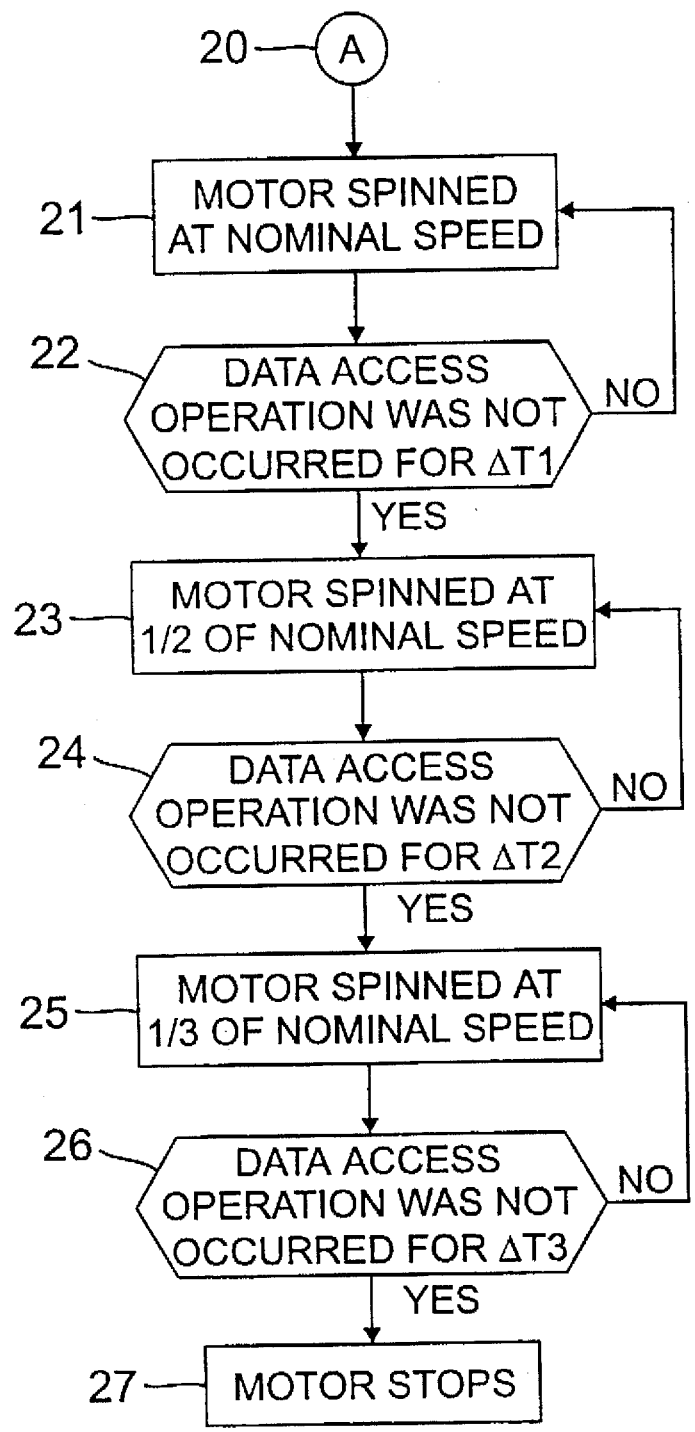
FIG. 2 shows the main flow chart of the method of the present invention.

The flow chart of FIG. 2 discloses the steps of the invention. Step 20 is the initialization. In step 21, the motor 16 is set to spin at Nominal speed of the audio-video player. In step 22, test if the disk data access operation has not occurred for a period of time ΔT1. If yes in step 22, in step 23, the motor 16 is set to spin at one half of the Nominal speed to save power consumption. If No in step 22, go back to step 21. In step 24, test if the disk data access operation has not occurred for a period of time ΔT2. If yes in step 24, in step 25, the motor 16 is set to spin at one third of the Nominal speed to further save power consumption. If No in step 24, go back to step 23. In step 26, test if the disk data access operation has not occurred for a period of time ΔT3. If yes in step 26, in step 27, the motor 16 is caused to stop totally to save power consumption entirely. If No in step 26, go back to step 25.

Figure 3:
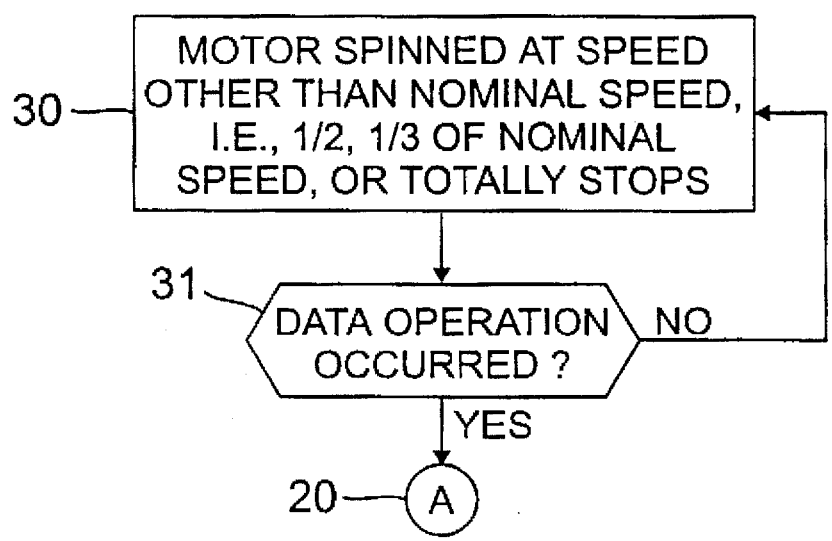
FIG. 3 shows the operations of the invention in which the spindle motor is spinned at speed other than the Nominal speed.

Shown in the steps of FIG. 3 are the steps involved when the motor 16 is operated at speed other than the Nominal speed. In the step 30, the motor 16 is operated at speed other than the Nominal speed. Step 31 tests if disk data access operation is occurred. If it is yes in step 31, go to initialization step 20 in FIG. 1. If it is no in step 31, go back to step 30.

It is to be noted, all steps shown are performed within the microcontroller 10 in a manner well known in the art and, when step 23, 25 or 27 is performed, the microcontroller 10 sends a signal to speed control circuit 91 via signal line 101. The speed control circuit 91 then instructs the motor driver to slow down the r.p.m. of the spindle motor 16 such that the corresponding spin speed is resulted.

I claim:

1. A method for controlling speed of a spindle motor within a disk player, the spindle motor driving a disk thereon, comprising the steps of:

(1) set speed of the spindle motor to operate at a Nominal speed which is greater than zero RPM;

(2) test if disk data access operation has not occurred for a first predetermined amount of time ΔT1;

(3) if result of step 2 is YES, set the spindle motor running at a speed S1 which is substantially equal to one half of the Nominal speed;

(4) test if disk data access operation has not occurred for a second predetermined amount of time ΔT2; and (5) if result of step 4 is YES, set the spindle motor running at a speed S2 which is substantially equal to one third of the Nominal speed.

2. The method as recited in claim 1, further comprises:

(6) test if disk data access operation has not occurred for a third predetermined amount of time ΔT3;

(7) if result of step 6 is YES, fully stop the spindle motor.

* * * * *